US011425155B2

(12) United States Patent
Jones et al.

(10) Patent No.: US 11,425,155 B2
(45) Date of Patent: Aug. 23, 2022

(54) MONITORING THE INTEGRITY OF A SPACE VEHICLE

(71) Applicant: The Aerospace Corporation, El Segundo, CA (US)

(72) Inventors: Adam Neal Jones, Santa Clarita, CA (US); Nicholas Cameron Cohen, Long Beach, CA (US); Jonathan Lin, El Segundo, CA (US); Douglas Robert Woodward, Redondo Beach, CA (US); Jacquelyn Christina Andrade, Rancho Cucamonga, CA (US); Eric John McDonald, Newbury Park, CA (US); Michael Harvey Cole, Torrance, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 385 days.

(21) Appl. No.: 16/817,503

(22) Filed: Mar. 12, 2020

(65) Prior Publication Data

US 2021/0288984 A1    Sep. 16, 2021

(51) Int. Cl.
| | |
|---|---|
| *H04L 9/40* | (2022.01) |
| *G06N 20/00* | (2019.01) |
| *H04L 43/08* | (2022.01) |
| *H04L 67/12* | (2022.01) |
| *G06N 5/04* | (2006.01) |
| *G06F 21/60* | (2013.01) |

(52) U.S. Cl.
CPC .......... *H04L 63/1425* (2013.01); *G06N 5/04* (2013.01); *G06N 20/00* (2019.01); *H04L 43/08* (2013.01); *H04L 63/145* (2013.01); *H04L 67/12* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 10,911,337 B1* | 2/2021 | De Kosnik | H04L 67/52 |
| 2018/0375886 A1* | 12/2018 | Kirti | H04L 63/1416 |
| 2019/0081960 A1* | 3/2019 | Kupfer | H04L 63/1416 |
| 2019/0081966 A1* | 3/2019 | Ploucha | H04L 63/1425 |
| 2019/0207976 A1* | 7/2019 | Yadav | H04L 63/1491 |
| 2019/0238633 A1* | 8/2019 | Rao | H04L 67/1025 |
| 2020/0213336 A1* | 7/2020 | Yu | H04L 63/1425 |
| 2021/0117232 A1* | 4/2021 | Sriharsha | G06F 16/256 |

* cited by examiner

*Primary Examiner* — Anh Vu H Ly
(74) *Attorney, Agent, or Firm* — LeonardPatel PC

(57) ABSTRACT

Space system TT&C monitoring includes analyzing network traffic comprising of data packets between a front-end processor (FEP) and a cryptographic unit. A JavaScript Object Notation (JSON) object is created when the network traffic containing a vehicle command is detected. The JSON object is transmitted, by way of a data transport mechanism, to either a cyber defense module or a security information and event management (SIEM) module for further ingestions and visualization. The JSON object is analyzed using machine learning (ML) module or a rule-based intrusion detection system (IDS) module to generate an anomaly score for the SIEM module for further ingestions and visualization.

21 Claims, 4 Drawing Sheets

MONITORING THE INTEGRITY OF A SPACE VEHICLE

STATE OF GOVERNMENT INTEREST

This invention was made with government support under Contract No. FA8802-19-C-0001 awarded by the Department of the Air Force. The government has certain rights in the invention.

FIELD

The present invention relates to space system TT&C monitoring, and more particularly, to monitoring the integrity of a space vehicle ("vehicle") telemetry, tracking, and command (TT&C) data.

BACKGROUND

Space mission systems rely on their TT&C commanding software to produce any type of record or log of what commands were sent to a vehicle. Not all mission systems, however, have this capability configured (or turned on). Instead, operators must have trust that whatever is sent from the TT&C software is correct, and is the only source of commanding data sent to the space vehicle.

Accordingly, an improved TT&C monitoring technique may be beneficial.

SUMMARY

Certain embodiments of the present invention may provide solutions to the problems and needs in the art that have not yet been fully identified, appreciated, or solved by current space mission systems. For example, some embodiments of the present invention pertain to monitoring the integrity of a space vehicle ("vehicle") telemetry, tracking, and command (TT&C) data.

In an embodiment, a computer-implemented method includes analyzing network traffic comprising of data packets between a front-end processor (FEP) and a cryptographic unit. The method also includes creating a JavaScript Object Notation (JSON) object when the network traffic containing a vehicle command is detected. The method further includes transmitting the JSON object, by way of a data transport mechanism, to either a cyber defense module or a security information and event management (SIEM) module for further ingestions and visualization. The method also includes analyzing the JSON object using machine learning (ML) module or a rule-based intrusion detection system (IDS) module to generate an anomaly score for the SIEM module for further ingestions and visualization.

In another embodiment, an apparatus includes at least one processor and memory comprising a set of instructions. The set of instructions is configured to cause the at least one processor to execute analyzing network traffic comprising of data packets between a FEP and a cryptographic unit. The set of instructions is further configured to cause the at least one processor to execute creating a JSON object when the network traffic containing a vehicle command is detected. The set of instructions is further configured to cause the at least one processor to execute transmitting the JSON object, by way of a data transport mechanism, to either a cyber defense module or a SIEM module for further ingestions and visualization. The set of instructions is further configured to cause the at least one processor to execute analyzing the JSON object using ML module or a rule-based IDS module to generate an anomaly score for the SIEM module for further ingestions and visualization.

In yet another embodiment, a computer program embodied on a non-transitory computer readable medium. The computer program is configured to cause at least one processor to execute analyzing network traffic comprising of data packets between a FEP and a cryptographic unit. The computer program is further configured to cause at least one processor to execute creating a JSON object when the network traffic containing a vehicle command is detected. The computer program is further configured to cause at least one processor to execute transmitting the JSON object, by way of a data transport mechanism, to either a cyber defense module or a SIEM module for further ingestions and visualization. The computer program is further configured to cause at least one processor to execute analyzing the JSON object using ML module or a rule-based IDS module to generate an anomaly score for the SIEM module for further ingestions and visualization.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
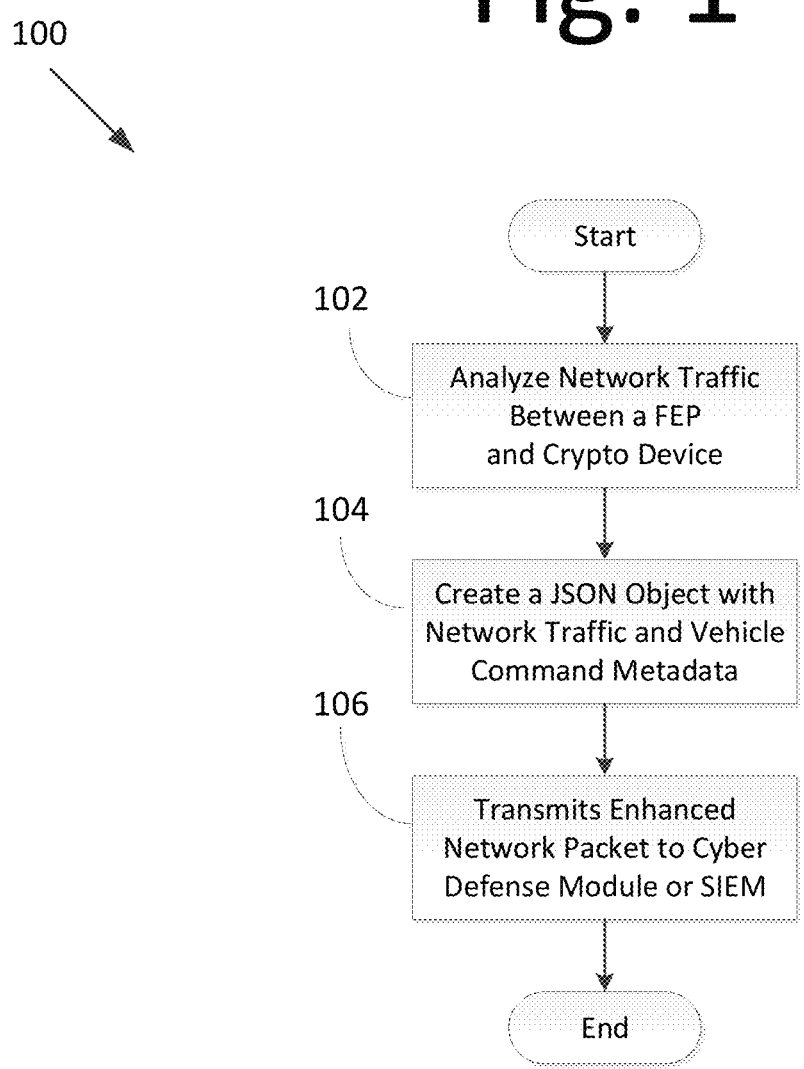
FIG. 1 is a flow diagram illustrating a custom network monitoring process for detecting space vehicle commands in transmitted data, according to an embodiment of the present invention.

Some embodiments generally pertain to monitoring the integrity of a vehicle's TT&C data. There are essentially three main parts to the TT&C monitoring application—a custom network monitor and parser (e.g., sceptreMON), cyber defense tools (e.g., sceptreIDS and sceptreML), and integration with a SIEM tool (ex, Splunk, ELK, LogRhythm). Depending on the embodiments, each of these parts may be modules built within the application. The application provides cyber security countermeasures for space mission systems across the enterprise that has the ability to monitor vehicle commands to the space vehicle (SV) within the FEP subsystem of a space mission system. The implementation seeks to disrupt the insider threat, near-sider threat, or any malicious commands sent to the vehicle. Specifically, a Defensive Cyber Operations (DCO) Operator or Mission Director may actively monitor the integrity of uplink commands being sent to the vehicle during contact, just prior to encryption of the command data leaving the mission system.

In some embodiments, a one-way network Test Access Point (TAP) is deployed to capture data packets containing vehicle commands immediately before the data enters a cryptographic unit. For example, the one-way network TAP is placed at the red Ethernet interface on each command channel of the crypto unit. This allows for the data to be collected at the point of encryption, negating the ability for an adversary to manipulate the data.

Custom Network Monitor

The space system TT&C Monitoring "pipeline" begins with analyzing network traffic between a FEP and crypto device using, for example, the sceptreMON network analyzer. In this example, SceptreMON is an application (e.g., custom network monitor module) that analyzes and detects network traffic on a space mission system. During integration, this application recognizes TT&C commands for the specific mission it is being deployed to. Once a network packet is detected to contain a vehicle command, sceptreMON creates a JSON object with the network traffic/vehicle command and enhances the network packet with data for the specific mission that has been preloaded into sceptreMON. The network packet is then sent through a data transport mechanism, for example, Apache Kafka, to either a cyber defense tool, such as sceptreIDS or sceptreML, for further analysis or SIEM tool for ingestions and visualization. In certain embodiments, data formats of vehicle families for parsing by sceptreMON are found in their respective on orbit handbook (OOH), interface control document (ICD), and/or Command Measurements List (CML) documentation. Classified appendices to these data format source documents are also reviewed and incorporated into sceptreMON for a comprehensive monitoring solution.

Defensive Cyber Operation Tool—sceptreIDS

Space systems have typically relied on strong boundary protection and encryption to and from the vehicle for cyber protection. Insider threats, interconnected networks, and supply chain risks mean that it may be possible for an adversary to bypass boundary protection. If an adversary bypasses boundary protection, the adversary may operate within the system and reach terminals communicating directly with the vehicle without operators easily detecting their activity.

IDS are widely deployed in networks to detect malicious cyber activity using indicators of attack. Example indicators for commercial intrusion detection systems are the creation of sensitive registry key values. National Institute of Standards and Technology (NIST) Databases of intrusion indicators are widely available for commercial solutions and types of attacks seen on typical Internet-connected networks. However, there is still a need for signatures that detect threats to SVs.

With SceptreIDS (e.g., IDS module), the term "indicator" refers to data that signals a cyber-attack, and "rules" refer to specific patterns in those indicators that signal a cyber-attack within the context of a space system. For example, the IDS module may detect an attempt to upload known malware to the vehicle. The indicator would be the contents of vehicle upload frames, and a rule for this attack would be the specific binary signature of the known malware, in this example.

Indicators of attack for the vehicle target both generic attacks expected against many types of space systems and specific threats to the space mission system. Indicators are developed via two methods: (1) adapting typical types of attacks seen on the Internet to space systems, and (2) adapting attacks that apply specifically to space systems. Described below are a few example indicators.

Attack Indicators-Commands Per Second

Denial of service attacks on the Internet effectively shut down access to target servers by overloading the servers' network connectivity. In an example, an adversary could overwhelm the limited uplink channel to the vehicle and deny legitimate operators command access to the vehicle.

The "commands per second indicator" may detect attempted denial of service attacks via command flooding by measuring the number of commands sent to the vehicle over a configurable window of time. The "command per second indicator" is configured with a reasonable threshold of maximum number of commands in that window for the system. This threshold depends on the uplink channel capacity and typical commanding behavior. For example, on a space system, a vehicle's OOH may specify an uplink channel capacity of 2 kbps and 128-bit commands. This means the system has a maximum commanding rate of under 16 commands per second. A reasonable threshold would be a sustained maximum rate of 16 commands per second over several seconds.

If the system continuously sends commands to the vehicle, including NOOPs when no other commands are sent, then the command stream for the "commands per second indicator" should be captured at the front-end processor's network-facing interface in addition to between the FEP and the cryptographic unit. In these cases, the commands per second between the FEP and the crypto may remain at the system maximum uplink rate. Therefore, measuring the commands per second sent to the FEP is a reliable indicator of an attacker attempting to flood the command channel.

Attack Indicators-Vehicle Software Uploads

Vehicle software uploads are a relatively unusual event and could present a way for an attacker to upload a malware payload into spacecraft memory. Thus, it may be beneficial to detect software uploads and bring them to the attention of cyber mission teams. When detected, the cyber mission team can verify with operators that the upload was planned and is not an attempted attack. The command sequence detector, described below, may detect a sequence of commands initializing a software upload.

It may also be beneficial to detect binary signatures of malware as it is uploaded to the vehicle. In an embodiment, a binary signatures detection module detects both known malware signatures and malware without a known signature. The known malware signature monitor vehicle uploads for the known binary signature and generates an alert if it detects that signature. The unknown malware detector module uses the information-theoretic entropy in the upload to detect malware. Typical software has a lot of repeating sequences, resulting in a low entropy measurement. Malware is often packed for compression and obfuscation, which increases its entropy. This can be a method for detecting malware in comparison to legitimate software binaries.

Attack Indicators-Command Sequences

There may be sequences of commands which do not make sense to send in normal operations, or which could do harm to the vehicle. These may not be included in operational procedures, but it may be possible for an attacker with knowledge of the system to send these commands as part of an attack to cause various effects on the vehicle.

The command sequence detector module detects given sequences of commands within a window of time or within a given number of commands. The command sequence detector module may detect commands sent in a specific order or may detect the given commands in any order.

Defensive Cyber Operation Tool—sceptreML

Multiple space mission systems require a tool to perform command anomaly prediction. In an embodiment, ML effectively monitors and detects anomalies in commands sent by mission systems to the vehicle. For example, Google's TensorFlow library, which provides sophisticated deep and recurrent neural network (RNN) algorithms, may be used. These algorithms represent the state of the art in sequence prediction and can model behavior seen in SV commanding.

Abnormal Command Sequences and State of Health

Intrusion detection is useful if the indicators of an attack can be envisioned in advance. In space systems, this may not always be the case since an attack may be highly targeted to the system with no historical precedent. In these cases, an anomaly detection method complements signature-based intrusion detection. The anomaly detection method uses ML techniques to train a model on normal system behavior, and alert when some action outside a threshold of normal behavior occurs.

Implementing the anomaly detection method with ML requires choosing an algorithm for detection, collecting training data, and choosing a reasonable threshold for categorizing an event as expected or anomalous. ML covers many algorithms and approaches. The choice of approach depends on the task and available data. Algorithms are generally categorized as supervised or unsupervised depending on whether the data is labeled or not.

ML, in some embodiments, uses supervised algorithms that is further divided into classifiers or regression depending on the output. Classifiers predict the output as one of a discrete number of classes. Regression predicts a continuous value. Classification may predict command sequences since there are a discrete number of SV commands, and regression may predict anomalous telemetry since many telemetry measurements such as voltages are continuous values.

Command Anomaly Prediction

For command sequence detection, a command sequence model is built based on RNNs; these are effective at learning patterns in sequences of data. In some embodiment, TensorFlow was implemented. TensorFlow is selected because of its ability to implement RNNs, and because it is the leading open-source library of machine learning algorithms, which makes it very easy to build custom data models in a rapid timespan.

In some embodiments, a simulated vehicle command data is created and an RNN model on this simulated data was trained. The model predicted what it thinks the next command will be based on what it has seen in the past. The RNN model generates an anomaly score based on how unlikely it thinks the actual next command observed would be, based on its training data.

For viability purposes, the RNN model was tested by generating additional simulated command data and injecting simulated attack commands into the sequence. Two types of tests were attempted: (1) altering a single command in the sequence, illustrating what would happen if an insider modified one of the command procedures; and (2) sending a sequence of commands that perform some malicious behavior on the spacecraft. The RNN model generated the proper error scores for each of the tests. The single command was detected immediately as the new sequence it created upon injection was not part of the RNN training set. Every malicious command was also detected immediately upon injection as this too was not part of the RNN training set.

State of Health Anomaly Prediction

State-of-health anomaly detection may provide indicators of a cyber-attack via effects on telemetry measurements. Operators often monitor telemetry measurements using high/low limits. ML has an advantage over high/low limits because it can predict behavior based on potentially dozens or hundreds of different measurements over time. This can help alert operators to potentially unusual activity they may not have noticed otherwise. State of health anomaly prediction is possible using several approaches. The goal is to predict a key telemetry value based on that value's recent history, or based on several other values, and generate an alert when the actual measured value differs from the predicted value by some amount.

Prediction is performed using multiple inputs (i.e., in a single telemetry frame), recent historical values over time, or a combination of both. Prediction using multiple values in a single telemetry frame is performed with algorithms such as linear regression, or regression using deep neural nets trained with an analog output. Prediction over time is performed with algorithms such as Kalman filters or autoregressive integrated moving average (ARIMA) or with RNNs in TensorFlow. In each case, an advantage of neural networks is that they can learn non-linear patterns in the data. RNNs may also perform prediction using multiple inputs over time. This is the most sophisticated way to predict state of health values and detect anomalies.

Finally, connectors are developed using, for example, Python and Kafka, to send relevant data from IDS module (alert messages) and ML module (anomaly scores) to a SIEM tool. Data produced by the defensive cyber tools are designed to be easily imported by any SIEM tool, ensuring that the products could be adapted to use on any space mission system. Once ingested, defensive cyber operators can configure their own thresholds on the data to alert operators to possible suspicious activities targeting the space vehicle. This data point is something that operators had very little insight into before the TT&C monitoring application was developed. This application's usefulness allows DCO operators to significantly decrease their response time to alerts, see the data in a readable format rather than a log format, and mitigates vulnerabilities found in past cyber tests. Overall, this enables a better understanding of the threats presented to operators.

FIG. 1 is a flow diagram illustrating a custom network monitoring process 100 for detecting vehicle commands in transmitted data, according to an embodiment of the present invention. In an embodiment, process 100 begins at 102 with the custom network monitoring module analyzing network traffic between a FEP and a crypto device using a network TAP to collect the data. At 104, the custom network monitoring module creates a JSON object with network traffic and vehicle command when a network packet containing a vehicle command is detected. The custom network monitoring module is further configured to enhance the network packet with data for the specific mission that has been preloaded into cyber defense module. At 106, the custom network monitoring module transmits the enhanced network packet to either the cyber defense module for further processing or to a SIEM application for ingestion and visualization. The transmission is executed through a server such as Kafka.

Figure 2:
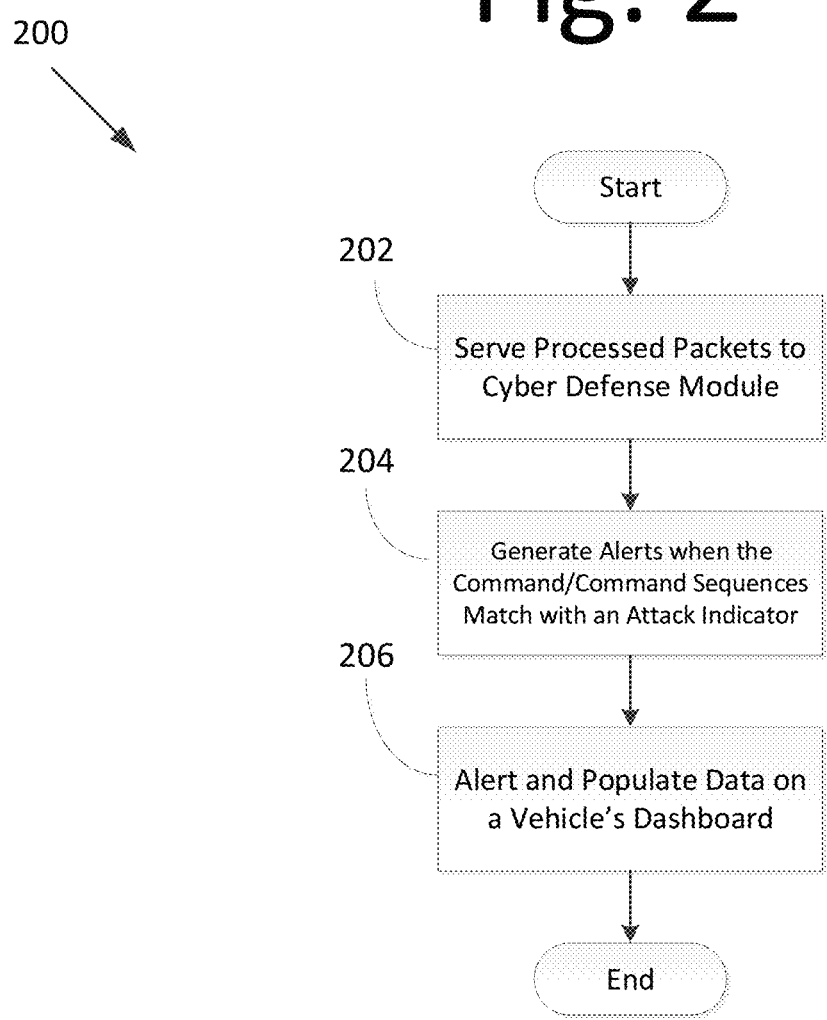
FIG. 2 is a flow diagram illustrating a TT&C monitoring process using a cyber defense module to detect attack signatures in transmitted space vehicle command data, according to an embodiment of the present invention.

FIG. 2 is a flow diagram illustrating a TT&C monitoring process 200 using scepter (or other space system) applications, according to an embodiment of the present invention. At 202, the server is configured to serve the processed packets to a cyber defense module (e.g., sceptreIDS). The cyber defense module at 204 generates alerts when the observed commands or command pattern matches with an attack indicator. For example, a preprogrammed ruleset, such as a disallowed command sequence, could be detected in commands transmitted to the vehicle. Specifically, if commands were observed in a specific order such as 3-4-1-2, a rule matching this particular command pattern would trigger an alert. This alert would be forwarded with a warning message specific to the attack. At 206, SIEM application may ingest alerts and populate data on a vehicle's dashboard.

Figure 3:
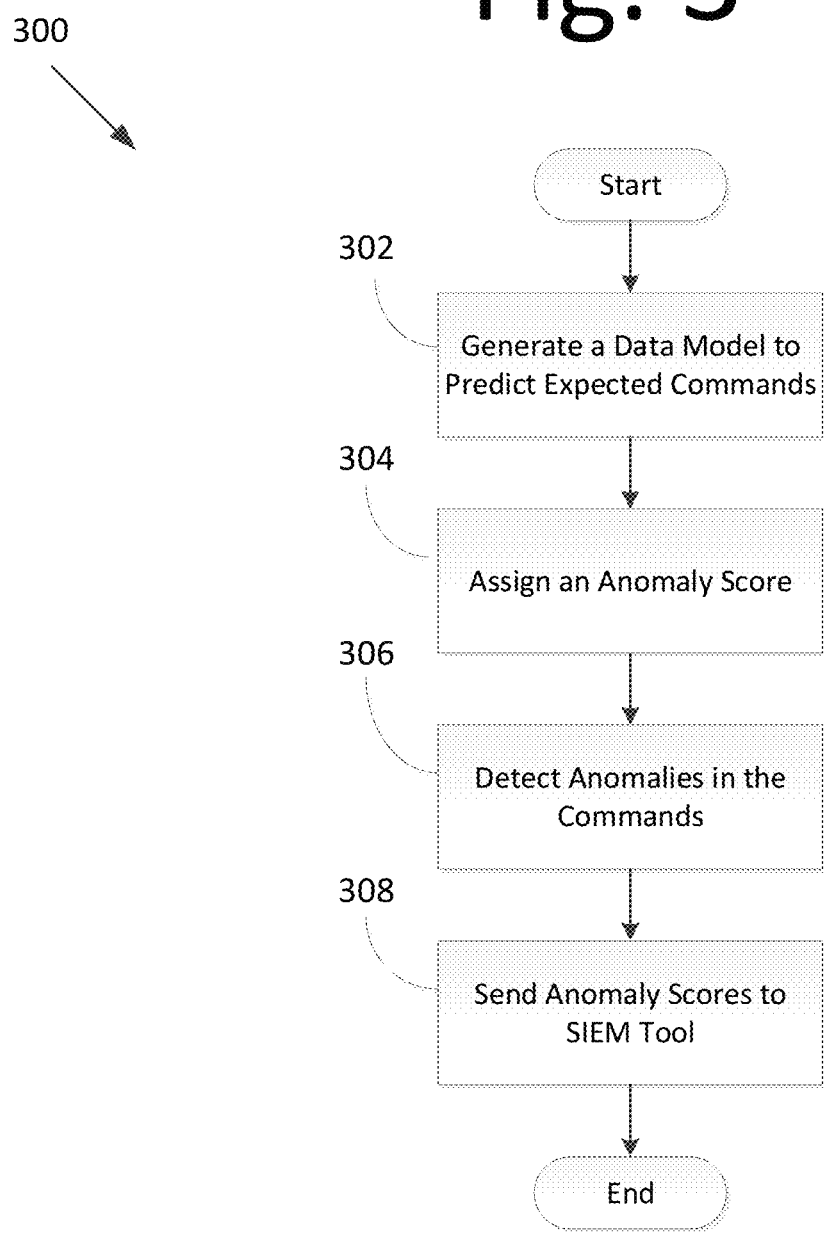
FIG. 3 is a flow diagram illustrating a process for analyzing the enhanced network packet using machine learning, according to an embodiment of the present invention.

FIG. 3 is a flow diagram illustrating a process 300 for analyzing the enhanced network packet using machine learning, according to an embodiment of the present invention. In some embodiments, process 300 begins at 302 with a ML module generating a data model that predicts expected commands. For example, the ML module trains algorithms on the data set created from mission specific vehicle commands, and in particular, is trained on command sequences that simulate typical operations. At 304, the ML module assigns an anomaly score based on the probability of the command using a sliding window of the past few commands. In one example, a score above a configurable threshold is considered an anomalous command. At 306, the ML module detects anomalies in the commands sent individually, malformed command patterns, or improperly formatted command sequences. Further, data is sent through the ML model as it is being sent from the FEP to a crypto unit. At 308, the ML module sends anomaly scores to a SIEM tool using the Kafka pipeline as discussed above.

In certain embodiments, a similar process, such as that shown in FIG. 3, may be executed for generating alerts when an attack indicator is identified. It should be noted that the IDS module includes pre-programmed code that identify and generate alerts.

The IDS module may detect patterns in space system protocols such as space vehicle telemetry, tracking, and control data indicating a space system threat. The IDS module may also provide real-time continuous monitoring for defensive cyber operators by alerting on pre-defined signatures tailored to mission TT&C data. For example, the IDS module sends alerts to a SIEM tool for use by defensive cyber operators.

Further, the IDS module may include several dozen classes of indicators based on cyber threat information from multiple systems. For example, the IDS modules utilize indicates that are tailored to each individual systems' protocols, operation, and threats.

Figure 4:
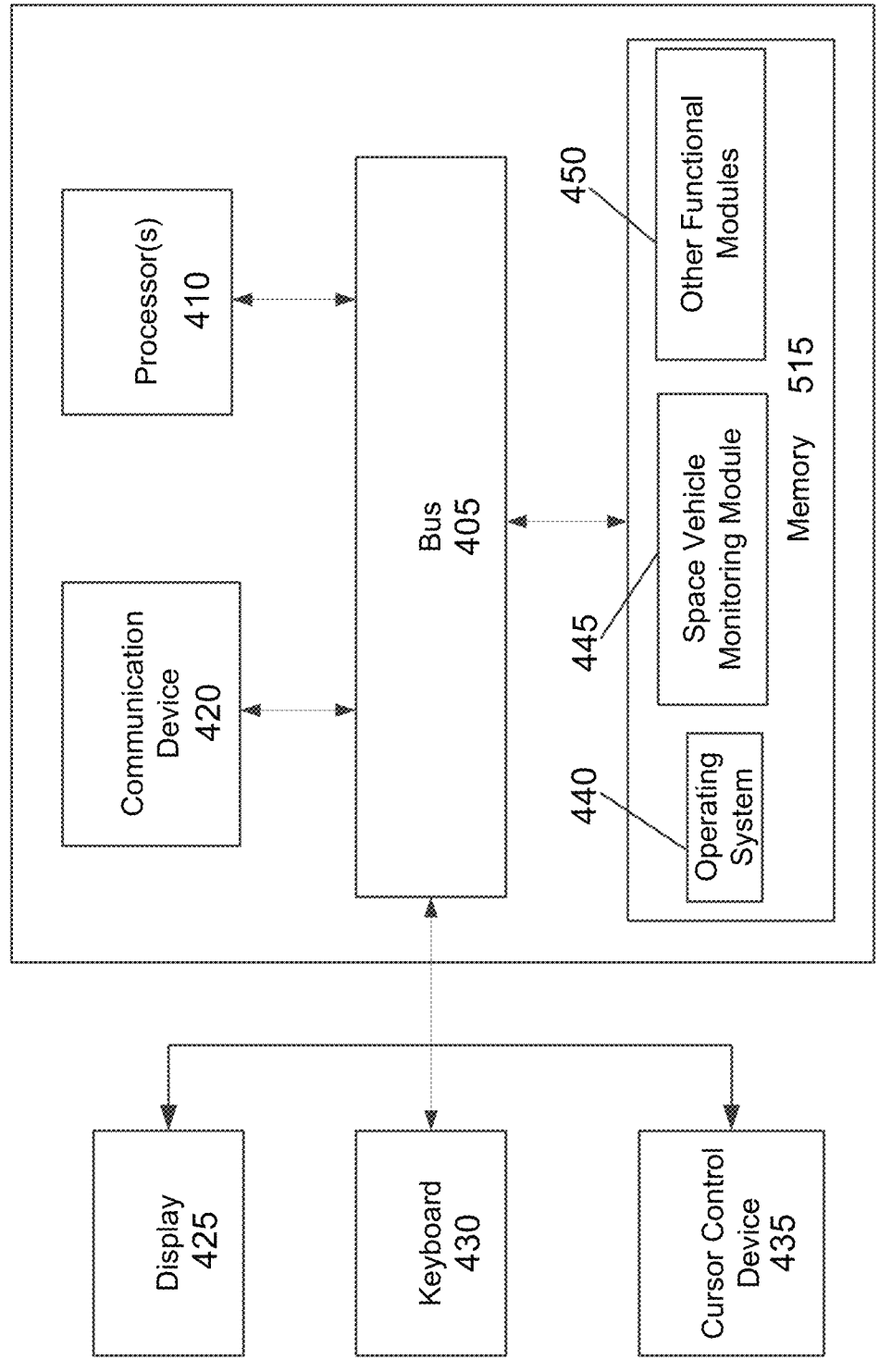
FIG. 4 is an architectural diagram illustrating a computing system configured to monitor and detect intrusions, according to an embodiment of the present invention.

FIG. 4 is an architectural diagram illustrating a computing system 400 configured to monitor and detect intrusions, according to an embodiment of the present invention. In some embodiments, computing system 400 may be one or more of the computing systems depicted and/or described herein. Computing system 400 includes a bus 405 or other communication mechanism for communicating information, and processor(s) 410 coupled to bus 405 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 410 may also have multiple processing cores, and at least some of the cores may be configured to perform specific functions. Multi-parallel processing may be used in some embodiments. In certain embodiments, at least one of processor(s) 410 may be a neuromorphic circuit that includes processing elements that mimic biological neurons. In some embodiments, neuromorphic circuits may not require the typical components of a Von Neumann computing architecture.

Computing system 400 further includes a memory 415 for storing information and instructions to be executed by processor(s) 410. Memory 415 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 410 and may include volatile media, non-volatile media, or both. The media may also be removable, non-removable, or both.

Additionally, computing system 400 includes a communication device 420, such as a transceiver, to provide access to a communications network via a wireless and/or wired connection.

Processor(s) 410 are further coupled via bus 405 to a display 425, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 425 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 430 and a cursor control device 435, such as a computer mouse, a touchpad, etc., are further coupled to bus 405 to enable a user to interface with computing system. However, in certain embodiments, a physical keyboard and mouse may not be present, and the user may interact with the device solely through display 425 and/or a touchpad (not shown). Any type and combination of input devices may be used as a matter of design choice. In certain embodiments, no physical input device and/or display is present. For instance, the user may interact with computing system 400 remotely via another computing system in communication therewith, or computing system 400 may operate autonomously.

Memory 415 stores software modules that provide functionality when executed by processor(s) 410. The modules include an operating system 540 for computing system 400. The modules further include a space vehicle monitoring module 445 that is configured to perform all, or part of, the processes described herein or derivatives thereof. Computing system 400 may include one or more additional functional modules 450 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2-4 may be performed by a computer program, encoding instructions for the processor(s) to perform at least part of the process(es) described in FIGS. 2-4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 410 of computing system 400 of FIG. 4) to implement all or part of the process steps described in FIGS. 1-3, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
analyzing network traffic comprising of data packets between a front-end processor (FEP) and a cryptographic unit;
creating a JavaScript Object Notation (JSON) object when the network traffic containing a vehicle command is detected;
transmitting the JSON object, by way of a data transport mechanism, to either a cyber defense module or a security information and event management (SIEM) module for further ingestions and visualization;
analyzing the JSON object using machine learning (ML) module or a rule-based intrusion detection system (IDS) module to generate an anomaly score for the SIEM module for further ingestions and visualization.

2. The computer-implemented method of claim 1, further comprising:
capturing the data packets containing one or more vehicles commands prior to the data packets entering a cryptographic unit to negate manipulation of the data packets by a third party intruder device, wherein
a one-way network test access point (TAP) is deployed to capture the data packets.

3. The computer-implemented method of claim 1, wherein the creating of the JSON object comprises creating the JSON object with the network traffic and vehicle command, and enhancing the JSON object with data for a specific mission.

4. The computer-implemented method of claim 1, wherein the analyzing of the JSON object comprising detecting an attempt to upload a known malware to a vehicle by analyzing contents of upload frames in the data packets and a specific binary signature of the known malware.

5. The computer-implemented method of claim 4, wherein the analyzing of the JSON object comprising utilizing one or more indicators to detect a cyber-attack in the data packet.

6. The computer-implemented method of claim 4, wherein the analyzing of the JSON object comprising utilizing one or more rules to detect specific patterns in the one or more indicators that signal a cyber-attack within a context of a space system.

7. The computer-implemented method of claim 1, wherein the analyzing of the JSON object comprising monitoring and detecting, using the ML module, anomalies in the vehicle command sent by mission systems to a vehicle.

8. An apparatus, comprising:
at least one processor; and
memory comprising a set of instructions, wherein the set of instructions is configured to cause the at least one processor to execute:
analyzing network traffic comprising of data packets between a front-end processor (FEP) and a cryptographic unit;
creating a JavaScript Object Notation (JSON) object when the network traffic containing a vehicle command is detected;
transmitting the JSON object, by way of a data transport mechanism, to either a cyber defense module or a security information and event management (SIEM) module for further ingestions and visualization;
analyzing the JSON object using machine learning (ML) module or a rule-based intrusion detection system (IDS) module to generate an anomaly score for the SIEM module for further ingestions and visualization.

9. The apparatus of claim 8, wherein the set of instructions is further configured to cause the at least one processor to execute:
capturing the data packets containing one or more vehicles commands prior to the data packets entering a cryptographic unit to negate manipulation of the data packets by a third party intruder device, wherein
a one-way network test access point (TAP) is deployed to capture the data packets.

10. The apparatus of claim 8, wherein the set of instructions is further configured to cause the at least one processor to execute:
creating the JSON object with the network traffic and vehicle command, and enhancing the JSON object with data for a specific mission.

11. The apparatus of claim 8, wherein the set of instructions is further configured to cause the at least one processor to execute:
detecting an attempt to upload a known malware to a vehicle by analyzing contents of upload frames in the data packet and a specific binary signature of the known malware.

12. The apparatus of claim 11, wherein the set of instructions is further configured to cause the at least one processor to execute:
utilizing one or more indicators to detect a cyber-attack in the data packet.

13. The apparatus of claim 11, wherein the set of instructions is further configured to cause the at least one processor to execute:
utilizing one or more rules to detect specific patterns in the one or more indicators that signal a cyber-attack within a context of a space system.

14. The apparatus of claim 8, wherein the set of instructions is further configured to cause the at least one processor to execute:
monitoring and detecting, using the ML module, anomalies in the vehicle command sent by mission systems to a vehicle.

15. A non-transitory computer readable comprising a computer program to be executed by at least one processor to perform;
analyzing network traffic comprising of data packets between a front-end processor (FEP) and a cryptographic unit;
creating a JavaScript Object Notation (JSON) object when the network traffic containing a vehicle command is detected;
transmitting the JSON object, by way of a data transport mechanism, to either a cyber defense module or a security information and event management (SIEM) module for further ingestions and visualization;
analyzing the JSON object using machine learning (ML) module or a rule-based intrusion detection system (IDS) module to generate an anomaly score for the SIEM module for further ingestions and visualization.

16. The non-transitory computer readable medium of claim 15, wherein the computer program is further configured to cause the at least one processor to execute:
capturing the data packets containing one or more vehicles commands prior to the data packets entering a cryptographic unit to negate manipulation of the data packets by a third party intruder device, wherein
a one-way network test access point (TAP) is deployed to capture the data packets.

17. The non-transitory computer readable medium of claim 15, wherein the computer program is further configured to cause the at least one processor to execute:
creating the JSON object with the network traffic and vehicle command, and enhancing the JSON object with data for a specific mission.

18. The non-transitory computer readable medium of claim 15, wherein the computer program is further configured to cause the at least one processor to execute:
detecting an attempt to upload a known malware to a vehicle by analyzing contents of upload frames in the data packets and a specific binary signature of the known malware.

19. The non-transitory computer readable medium of claim 18, wherein the computer program is further configured to cause the at least one processor to execute:
utilizing one or more indicators to detect a cyber-attack in the data packet.

20. The non-transitory computer readable medium of claim 18, wherein the computer program is further configured to cause the at least one processor to execute:
utilizing one or more rules to detect specific patterns in the one or more indicators that signal a cyber-attack within a context of a space system.

21. The non-transitory computer readable medium of claim 15, wherein the computer program is further configured to cause the at least one processor to execute:
monitoring and detecting, using the ML module, anomalies in the vehicle command sent by mission systems to a vehicle.

* * * * *